United States Patent
Kanungo

(10) Patent No.: US 8,984,295 B2
(45) Date of Patent: Mar. 17, 2015

(54) SECURE ACCESS TO ELECTRONIC DEVICES

(75) Inventor: Rajesh Kanungo, Oakland, CA (US)

(73) Assignee: Echostar Technologies L.L.C., Englewood, CO (US)

(*) Notice: Subject to any disclaimer, the term of this patent is extended or adjusted under 35 U.S.C. 154(b) by 261 days.

(21) Appl. No.: 13/077,702

(22) Filed: Mar. 31, 2011

(65) Prior Publication Data

US 2012/0254622 A1 Oct. 4, 2012

(51) Int. Cl.
*H04L 29/06* (2006.01)
*G06F 21/34* (2013.01)

(52) U.S. Cl.
CPC .................................. *G06F 21/34* (2013.01)
USPC ......................................................... 713/183

(58) Field of Classification Search
CPC ....... G06F 21/34; G06F 21/575; G06F 21/31; G06F 1/3203; G06F 21/62; G06F 21/85; G06F 21/126; G06F 21/46; H04L 63/083; H04L 9/0863; H04L 9/3226; H04L 9/0822; H04W 12/06; G06Q 20/4012
USPC ............................................. 713/183; 726/5
See application file for complete search history.

(56) References Cited

U.S. PATENT DOCUMENTS

| | | | |
|---|---|---|---|
| 2002/0094085 A1* | 7/2002 | Roberts | 380/262 |
| 2003/0028813 A1* | 2/2003 | Lewis | 713/202 |
| 2005/0108571 A1* | 5/2005 | Lu et al. | 713/201 |
| 2006/0085634 A1* | 4/2006 | Jain et al. | 713/156 |
| 2009/0103725 A1* | 4/2009 | Tang et al. | 380/45 |
| 2009/0106550 A1* | 4/2009 | Mohamed | 713/156 |
| 2009/0187759 A1* | 7/2009 | Marsico | 713/155 |
| 2009/0198993 A1* | 8/2009 | Kim | 713/150 |
| 2010/0138660 A1* | 6/2010 | Haynes et al. | 713/171 |
| 2011/0197059 A1* | 8/2011 | Klein et al. | 713/155 |
| 2011/0235806 A1* | 9/2011 | Fukuda | 380/282 |
| 2012/0226908 A1* | 9/2012 | Mokrushin et al. | 713/168 |

* cited by examiner

*Primary Examiner* — Ali Abyaneh
(74) *Attorney, Agent, or Firm* — Seed IP Law Group PLLC

(57) ABSTRACT

Disclosed is an electronic device that selects a password and encrypts it utilizing a public key of a public/private encryption key pair. The electronic device then provides the encrypted password to a client device when an access request is received from the client device. The client device proceeds to obtain an unencrypted version of the password by submitting the encrypted password to a private key server (which utilizes the private key of the public/private encryption key pair to decrypt the password) and receiving the decrypted password in return. The client device then returns the password to the electronic device which, upon receiving the decrypted password, allows access from the client device. The device generates the password once during operation or each time an access request is received.

18 Claims, 3 Drawing Sheets

SECURE ACCESS TO ELECTRONIC DEVICES

FIELD OF THE INVENTION

This disclosure relates generally to electronic devices, and more specifically to secure access to electronic devices.

SUMMARY

The present disclosure discloses systems and methods for secure access to electronic devices. An electronic device may select a password and encrypt the password utilizing a public key component of a public/private key encryption pair. When the electronic device receives an access request from a client device, the electronic device may provide the encrypted password to the client device. The client device may obtain an unencrypted version of the password by submitting the encrypted password to a private key server. The private key server may have access to the private key encryption component of the public/private key pair corresponding to the public key encryption component. The private key server may utilize the private key encryption component to decrypt the password and then return the unencrypted version of the password to the client device, which may then return the unencrypted version of the password to the electronic device. When the electronic device receives the unencrypted password from the client device, the electronic device may allow the client device to access the electronic device.

The electronic device may select a password utilizing a variety of different methods. For example, the electronic device may generate a random number or pseudo random number and utilize such as the password, convert such a number into a hexadecimal and/or character based equivalent and utilize such as the password, and so on. Further, communication between the electronic device and the client device and/or the client device and the private key server may utilize encryption or other security mechanisms (such as a secure shell connection, a connection utilizing a transport layer security protocol, a connection utilizing a secure sockets layer protocol, and so on) such that the unencrypted password and other communications are not intercepted by parties other than the electronic device, the client device, and/or the private key server.

In some implementations, the electronic device may generate the password upon powering up or upon the occurrence of similar events. However, in other implementations, the electronic device may generate a new password each time that an access request is received and may only allow access when provided an unencrypted version of the most recently issued password.

In various implementations, the electronic device may generate, encrypt, and transmit a single password. However, in various other implementations the electronic device may generate a number of different passwords, encrypt the number of passwords with a number of different public encryption key components, and/or transmit a number of different encrypted passwords in response to an access request. In this way, the electronic device may be able to support access by different entities who may have been assigned different access permission levels and/or may have access to different private encryption key components via the private key server.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
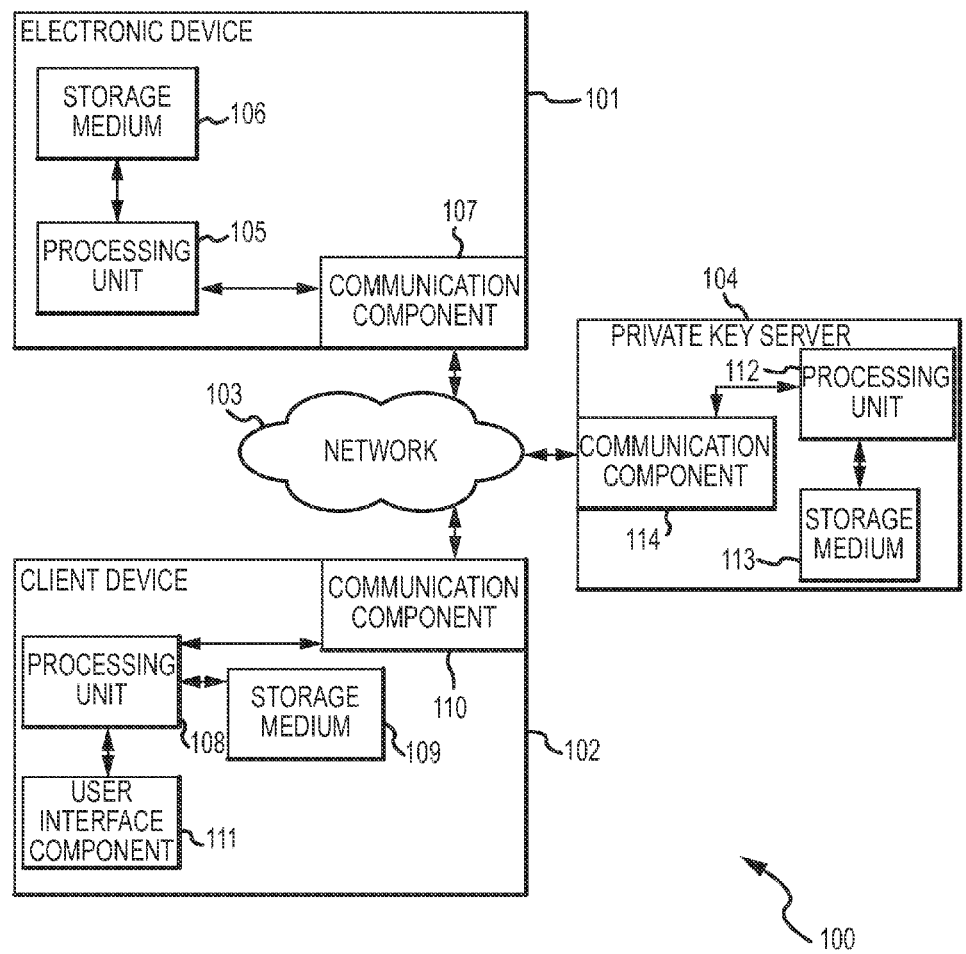
FIG. 1 is a block diagram illustrating a system for secure access to electronic devices.

The description that follows includes sample systems, methods, and computer program products that embody various elements of the present disclosure. However, it should be understood that the described disclosure may be practiced in a variety of forms in addition to those described herein.

Electronic devices (such as content receivers, content retransmitters, set top boxes, computing devices, laptop computers, desktop computers, mobile computers, digital video recorders, digital video disc players, smart phones, cellular telephones, and so on) are utilized in virtually every aspect of modern life. Frequently, users may need to access such electronic devices remotely in order to perform a variety of different functions utilizing the electronic devices. For example, repair and/or maintenance personnel may need to remotely access such electronic devices in order to perform refurbishment activities, management activities, diagnostic activities, configuration activities and so on.

However, though users such as repair personnel may legitimately require remote access to such electronic devices, precautions may need to be taken in order to prevent unauthorized and/or malicious users from accessing the electronic devices. Electronic devices may not be able to be fully utilized effectively if users such as repair personnel are not able to access such devices and/or if unauthorized and/or malicious users are allowed to access and do harm to such electronic devices.

Electronic devices may be configured to allow access only to users who are able to verify themselves through one or more security measures, such as via one or more passwords. Such access via a password may even be performed via an encrypted connection, such as a secure shell (SSH) connection. However, this may require a user who needs to access a particular electronic device to know the password for that electronic device. Given the number of electronic devices in modern life, the number of different entities that may be involved in the production and/or servicing of such devices, and other such factors, creating and managing passwords for such devices so that a particular electronic device is secure may be extremely costly and/or burdensome. A variety of key based security systems may also be used, either to supplement or instead of such password based systems, but even with such systems making sure that a particular device is secure (particularly when access may need to be granted and/or denied on a device by device basis) may still be unduly expensive and/or burdensome.

The present disclosure discloses systems and methods for secure access to electronic devices. An electronic device may select a password (such as by generating a random number and converting the number into a character based equivalent)

and may encrypt the password utilizing a public key component of a public/private key encryption pair. When the electronic device receives an access request from a client device (which may be received over an encrypted connection such as a SSH connection), the electronic device may provide the encrypted password. The client device may then obtain an unencrypted version of the password (such as by submitting the encrypted password to a private key server that utilizes the private key encryption component of the public/private key pair to decrypt the password) and submit the unencrypted password to the electronic device. When the electronic device receives the unencrypted password (which may be received over the encrypted connection), the electronic device may allow the client device to access the electronic device. In this way, the electronic device is able to provide individualized, secure access to the client device without requiring individualized security measures to be preinstalled on the electronic device and/or communicated to the user of the client device.

FIG. 1 is a block diagram illustrating a system 100 for secure access to electronic devices. The system 100 includes an electronic device 101 communicably coupled to a client device utilizing a network 103. The client device may also be communicably coupled to a private key server 104 via the network 103.

The electronic device may be any kind of electronic device such as a content receiver, a content retransmitter, a set top box, a computing device, a laptop computer, a desktop computer, a mobile computer, a digital video recorder, a digital video disc player, a smart phone, a cellular telephone, and/or other electronic device capable of being accessed by the client device. The client device may be any device such as a computing device, a laptop computer, a desktop computer, a mobile computer, a tablet computer, a cellular telephone, a smart phone, and/or other device capable of accessing the electronic device. The private key server may be any kind of computing device (such as a server computer, a desktop computer, a mobile computer and/or other such computing device) that is capable of storing one or more private keys and utilizing such private keys to decrypt requested content. The network may be any kind of wired and/or wireless communication media utilized to connect the electronic device and client device or the client device and the private key server. Such communication media may include a local area network, a wide area network, the Internet, a serial connection, a Bluetooth® connection, a WiFi connection, an Ethernet connection, a direct connection between the electronic device and the client device and/or the private key server and the client device, and so on.

Further, though the network is shown as a single network connecting both the electronic device and the client device and the private key server and the electronic device, in various implementations one or more different networks and/or direct communication paths may be utilized to connect the electronic device and the client device and/or the private key server and the client device. Further, although the client device, the electronic device, and the private key server are illustrated and described as separate devices, it should be understood that in various implementations the client device, the electronic device, and the private key server may be incorporated into one or more integrated devices.

The electronic device 101 may include one or more processing units 105, one or more non-transitory storage media 106 (which may take the form of, but is not limited to, a magnetic storage medium; optical storage medium; magneto-optical storage medium; read only memory; random access memory; erasable programmable memory; flash memory; and so on), and one or more communication components 107.

The processing unit 105 may execute instructions stored in the non-transitory storage medium 106 to select a password. The password may be selected in a random and/or pseudo random fashion instead of being assigned to a predetermined, easily guessed formula such as utilizing an Ethernet address as the password. In some implementations, a random number generator and/or pseudo random number may be utilized to generate one or more random numbers and/or pseudo random numbers (some electronic devices are not capable of generating true random numbers and instead generate pseudo random numbers, or numbers that resemble random numbers). Such numbers may be utilized as the password and/or the binary value of such may be converted to its hexadecimal form and/or otherwise converted to a character string and utilized as the password. However, in other implementations, other procedures for selecting a password may be utilized.

The processing unit 105 may also execute instructions stored in the non-transitory storage medium 106 to encrypt the password utilizing one or more public key components of one or more public/private key encryption pairs. The encrypted password may be stored in the non-transitory storage medium 106. Such a public key component may also be stored in the non-transitory storage medium 106.

The electronic device 101 may receive one or more access requests from the client device 102 via the communication component 107. Upon receiving such a request, the processing unit 105 may provide the encrypted password to the client device 102 via the communication component 107. The processing unit 105 may then allow the client device 102 to access the electronic device 101 upon receipt of a decrypted version of the password from the client device 102 via the communication component 107.

For example, the electronic device 101 may receive a SSH access request from the client device 102. As the access request is communicated via a SSH connection, the communication between the electronic device 101 and the client device 102 may be encrypted. In response to receiving the access request, the electronic device 101 may transmit one or more prompts to the client device 102 for a password and/or a login as well as a banner. The banner may be the encrypted password. In response to the prompt, the client device 102 may supply the decrypted form of the password. The electronic device 101 may then allow access by the client device 102.

The client device 102 may include one or more processing units 108, one or more non-transitory storage media 109 (which may take the form of, but is not limited to, a magnetic storage medium; optical storage medium; magneto-optical storage medium; read only memory; random access memory; erasable programmable memory; flash memory; and so on), one or more communication components 110, and one or more user interface components 111. The processing unit 108 may execute instructions stored in the non-transitory storage media 109 to request access to the electronic device 101 via the communication component 110. Such a request may be performed in response to user input received via the user interface component 111 (which may be operable to receive input from and/or transmit output to one or more user input/output devices such as one or more monitors, keyboards, speakers, mice, virtual keyboards, and so on). After making such a request, the client device 102 may receive the encrypted password from the electronic device 101 via the communication component 110. The client device 102 may submit the encrypted password to the private key server 104 via the communication component 110, receive the decrypted version of the password back from the private key server 104 via the communication component 110, and transmit the decrypted version of the password to the electronic device 101. Subsequently, the client device 102 may be allowed to access the electronic device 101.

The private key server 104 may include one or more processing units 112, one or more non-transitory storage media 113 (which may take the form of, but is not limited to, a magnetic storage medium; optical storage medium; magneto-optical storage medium; read only memory; random access memory; erasable programmable memory; flash memory; and so on), and one or more communication components 114. The private key server 104 may receive the encrypted password from the client device 102 via the communication component 114. The processing unit 112 may execute instructions stored in the non-transitory storage media 113 to decrypt the password utilizing one or more private encryption key components of a private key encryption pair (which may be stored in the non-transitory storage media 113) that corresponds to the public key utilized to encrypt the password. The private key server 104 may then transmit the decrypted password to the client device 102 via the communication component 114.

The communication between the private key server 104 and the client device 102 may be encrypted and/or otherwise secured. For example, in implementations where the private key server 104 operates as a web or other kind of service for decrypting passwords that are encrypted utilizing the public encryption key components of public/private encryption key pairs for which the private key server 104 is able to access the private encryption key components, the communication between the private key server 104 and the client device 102 may be performed utilizing transport layer security protocols, secure sockets layer protocols, and/or other such cryptographic and/or security communication protocols. Additionally, the private key server 104 may authenticate the user of the client device 102 and/or the client device 102 in order to verify that permissions are configured to allow use of the private key to decrypt passwords for the user and/or the client device 102.

Figure 2:
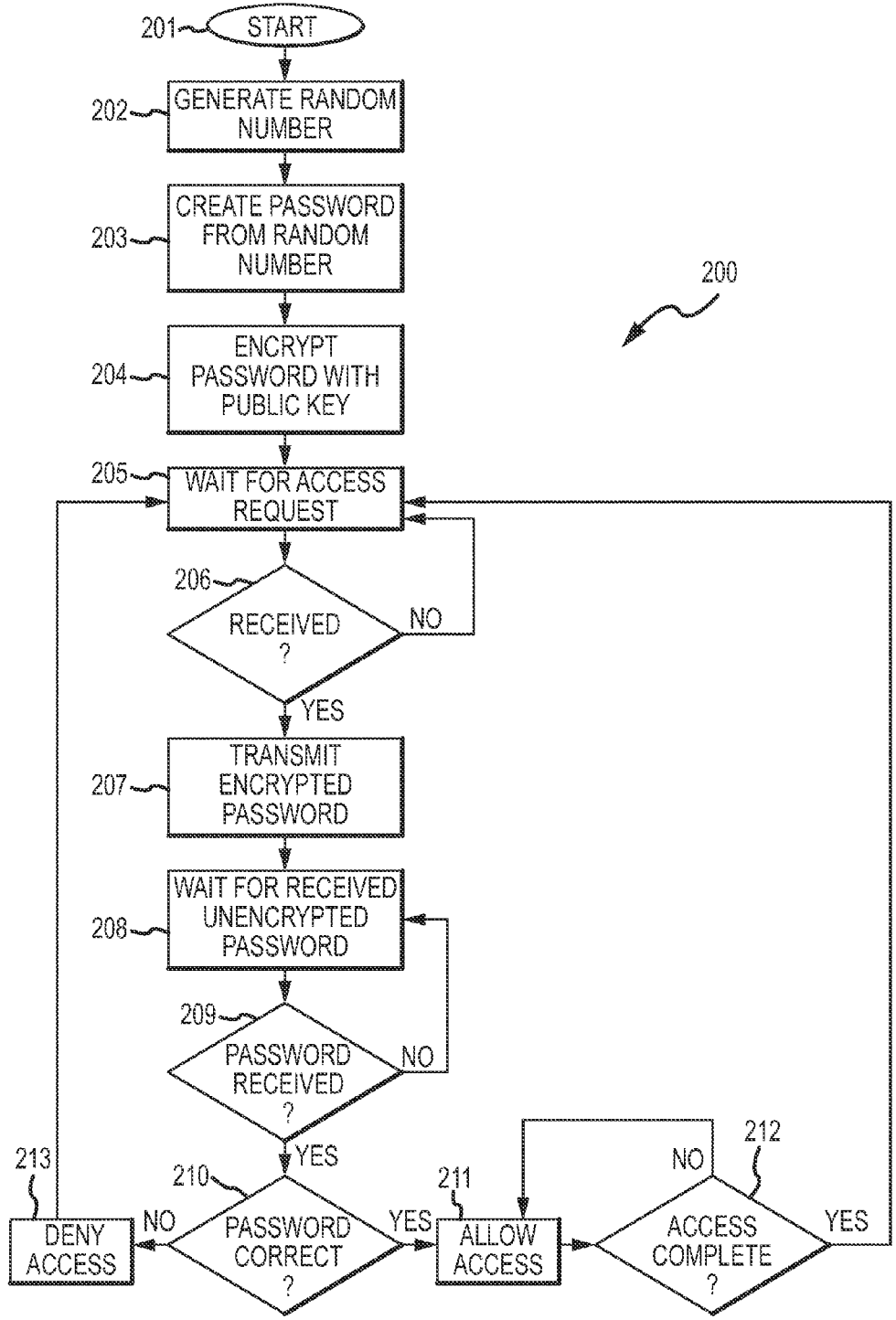
FIG. 2 is a flow chart illustrating a first method for secure access to electronic devices. This method may be performed by the system of FIG. 1.

FIG. 2 illustrates a method 200 for secure access to electronic devices. The method 200 may be performed by the electronic device 101 of FIG. 1. The flow begins at block 201 and proceeds to block 202 where the electronic device generates a random number. The flow then proceeds to block 203 where the electronic device creates a password from the random number. Next, the flow proceeds to block 204 where the electronic device encrypts the password with a public key encryption component of a public/private encryption key pair. The flow then proceeds to block 205 where the electronic device waits for an access request to be received from a client device, such as the client device 102.

Next, the flow proceeds to block 206 where the electronic device 101 determines whether an access request has been received. If not, the flow returns to block 205 where the electronic device continues to wait for an access request to be received. Otherwise, the flow proceeds to block 207.

At block 207, after an access request has been received, the electronic device 101 transmits the encrypted password to the requestor of the access request. The flow then proceeds to block 208 where the electronic device waits for an unencrypted version of the encrypted password to be received. Next, the flow proceeds to block 209 where the electronic device determines whether or not the unencrypted version of the encrypted password has been received. If not, the flow returns to block 208 where the electronic device continues to wait for an unencrypted version of the encrypted password to be received. Otherwise, the flow proceeds to block 210.

At block 210, after receiving an unencrypted version of the encrypted password, the electronic device 101 determines whether or not the unencrypted version of the encrypted password is correct. If not, the flow proceeds to block 213 where the electronic device denies access before the flow returns to block 205 and the electronic device waits for an access request to be received. Otherwise, the flow proceeds to block 211 where the electronic device allows access.

Next, the flow proceeds to block 212 where the electronic device 101 determines whether or not the allowed access is complete. If so, the flow returns to block 205 and the electronic device waits for an access request to be received. Otherwise, the flow returns to block 211 where the electronic device continues to allow access.

Figure 3:
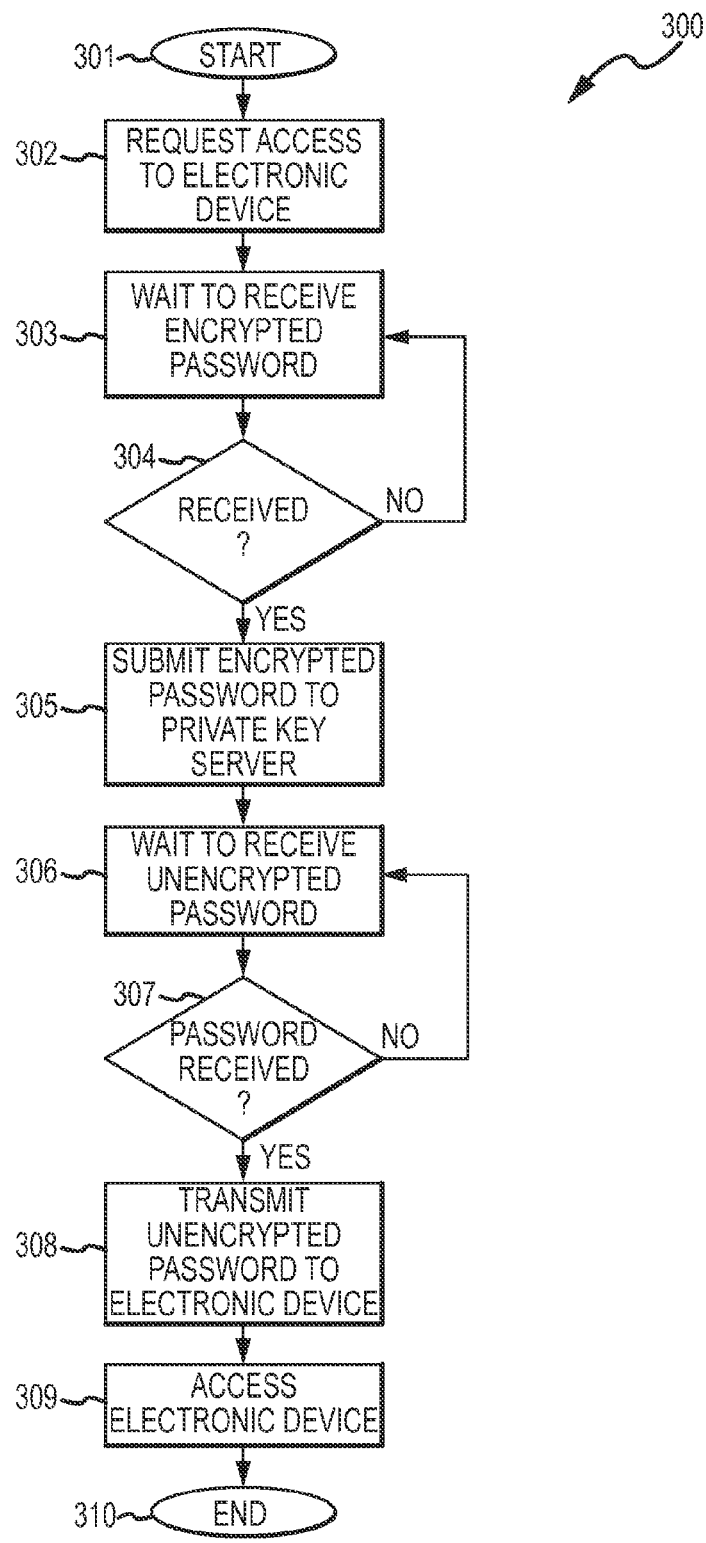
FIG. 3 is a flow chart illustrating a second method for secure access to electronic devices. This method may be performed by the system of FIG. 1.

FIG. 3 illustrates a method 300 for secure access to electronic devices. The method 300 may be performed by the client device 102 of FIG. 1. The flow begins at block 301 and proceeds to block 302 where the client device requests access to the electronic device 101. The client device may request access to the electronic device in response to user input received via the user interface component 111. The flow then proceeds to block 303 where the client device waits to receive the encrypted password from the electronic device. Next, the flow proceeds to block 304 where the client device determines whether or not the encrypted password has been received. If so, the flow proceeds to block 305. Otherwise, the flow returns to block 303 where the client device continues to wait for the encrypted password to be received.

At block 305, after the encrypted password is received, the client device 102 submits the encrypted password to the private key server 104 and the flow proceeds to block 306. At block 306, the client device waits to receive the unencrypted version of the encrypted password from the private key server. The flow then proceeds to block 307 where the client device determines whether or not the unencrypted version of the encrypted password has been received. If not, the flow returns to block 306 where the client device continues to wait for receipt of the unencrypted version of the encrypted password. Otherwise, the flow proceeds to block 308.

At block 308, after the unencrypted version of the encrypted password has been received, the client device 102 transmits the unencrypted version of the encrypted password to the electronic device 101 and the flow proceeds to block 309. At block 309, the client device accesses the electronic device. The flow then proceeds to block 310 and ends.

Returning to FIG. 1, in an example implementation, the electronic device 101 may store a public key encryption component of a public/private encryption key pair, the private key encryption component of which is stored by a private key service hosted by the private key server 104. The electronic device may be configured upon powering up to select a number of binary digits from a random number file of the electronic device, convert that sequence of binary digits to hexadecimal, and set the password for accessing the electronic device to the hexadecimal value. The electronic device may also encrypt the password and store the encrypted password. When the electronic device receives an access request from the client device 102 via a SSH connection, the electronic device may be configured to read the encrypted password and transmit such to the client device as the banner for the SSH connection.

A user of the client device 102 may copy the banner and paste it into a designated file stored on the client device. The user may then trigger the client device that the designated file needs to be decrypted and the client device may submit the contents of the designated file to the private key server 104. In response, the private key server may utilize the private key encryption component of the public/private encryption key pair to decrypt the password and return the decrypted version of the encrypted password to the client device. Upon receipt of the decrypted version of the encrypted password, the client device may display the decrypted version of the encrypted password to the user, who may then cut and paste such into a login prompt transmitted by the electronic device 101. Alternatively, the client device may transmit the decrypted version of the encrypted password to the electronic device automatically upon receipt, store the decrypted version of the encrypted password in a file upon receipt (such as the designated file) whereupon the user may cut and paste such password from the file into a login prompt provided by the electronic device or indicate to the client device to transmit the contents of the file to the electronic device, and so on. Subsequently, the user may utilize the client device to access the electronic device.

In some implementations, the electronic device 101 may generate the password upon powering up, initializing an access request responding service, or upon the occurrence of similar events. In other implementations, the electronic device may generate a new password each time that an access request is received. In such other implementations, the electronic device may not allow access if provided an unencrypted version of a password that was generated for a previous access request if a subsequent access request is received. Instead, the old password may no longer be recognized and the password generated for the subsequent access may be required in order to access the electronic device.

In various implementations, the electronic device 101 may be configured to generate passwords that include fewer characters (such as letters, numbers, and/or special characters) than the public key encryption component. In this way, the electronic device may ensure that the encrypted password will not exceed a set maximum password length.

In one or more implementations, the electronic device 101 may generate, encrypt, and transmit a single password. However, in other implementations the electronic device may generate a number of different passwords, encrypt the number of passwords with a number of different public encryption key components, and/or transmit a number of different encrypted passwords in response to an access request. If the electronic device transmits multiple encrypted passwords in response to an access request, a user and/or the client device 102 may select one or more of the multiple encrypted passwords provided that the user end/or the client device will have decrypted by the private key server in order to access the electronic device instead of all of the multiple encrypted passwords. In this way, the electronic device may be able to support access by different entities who may have been assigned different access permission levels and/or may have access to different private encryption key components via the private key server 104.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for secure access to an electronic device, the method comprising:
generating a plurality of passwords including a first password and a second password upon the electronic device powering up;
encrypting each of the plurality of passwords using a public encryption key component of a plurality of public/private encryption key pairs;
storing the plurality of encrypted passwords in a storage medium;
receiving from a client device, a first request to access the electronic device;
in response to the first request, transmitting the plurality of encrypted passwords to the client device;
causing the client device to submit more than one of the plurality of encrypted passwords to a private key server for decryption, the private key server configured to decrypt each of the encrypted passwords using a private key encryption component of one of public/private encryption key pairs,
receiving from the client device, a decrypted password; and
when the decrypted password matches one of the plurality of passwords, allowing the client device access to the electronic device, the access being an access of one of a plurality of permission levels.

2. The method of claim 1, wherein said operation of generating the plurality of passwords comprises:
generating one of a random number and a pseudo random number; and
generating one of a random string and a pseudo random string from the generated random number and pseudo random number.

3. The method of claim 1, wherein transmitting the encrypted first password comprises:

transmitting the plurality of encrypted passwords over a secure channel on which a cryptographic network protocol is used to transfer data, and wherein receiving the decrypted password comprises:
receiving the decrypted password over the secure channel.

4. The method of claim 3, wherein the cryptographic network protocol is secure shell (SSH).

5. The method of claim 3, wherein the client device submits the plurality of encrypted passwords to the private key server over a secure channel on which cryptographic network protocol is used to transfer data.

6. The method of claim 1, wherein the each one of the plurality of passwords includes fewer characters than the public encryption key component.

7. A secure access system comprising:
an electronic device including:
a non-transitory storage medium, and
a processing unit configured to execute instructions stored in the non-transitory medium to
select a plurality of passwords,
encrypt each of the plurality of passwords using a public encryption key component of one of a plurality of public/private encryption key pairs,
store the encrypted passwords in the non-transitory storage medium,
receive a first request to access the electronic device,
transmit the plurality of encrypted passwords in response to receiving the first request,
receive a decrypted password; and
grant access of one of a plurality of permission levels to the electronic device when the received decrypted password matches one of the plurality of passwords;
a private key server configured to
decrypt more than one of the plurality of encrypted passwords, using a private key encryption component of more than one of the plurality of public/private encryption key pairs, and
transmit the decrypted password via a private key server communication component; and
a client device including a processing unit, the processing unit configured to
request access to the electronic device;
receive the plurality of encrypted passwords from the electronic device;
cause the private key server to decrypt more than one of the plurality of encrypted passwords;
receive the decrypted passwords from the private key server via a private key server communication component and
transmit the decrypted passwords to the electronic device.

8. The system of claim 7, wherein the electronic device and the client device communicate over a first secure channel on which cryptographic network protocol is used to transfer data, and wherein the client device and the private key server communicate over a second secure channel on which cryptographic network protocol is used to transfer data.

9. The system of claim 8, wherein secure shell (SSH) is used as cryptographic network protocol over the first secure channel.

10. The system of claim 7, wherein the processing unit in the electronic device selects one of the plurality of passwords when the electronic device is powered up.

11. The system of claim 7, wherein the selected password includes fewer characters than the at least one public encryption key component.

12. The system of claim 7, wherein the processing unit selects the one of the plurality of passwords by generating at least one character string based on at least one of at least one random number and at least one pseudo random number.

13. A method for secure access to an electronic device, the method comprising:
transmitting to the electronic device a request to access the electronic device;
subsequent to transmitting the request, receiving from the electronic device, a plurality of encrypted passwords, each of the plurality of encrypted passwords having been encrypted with a public key component of more than one of the plurality of public/private key encryption pairs;
submitting the encrypted passwords to a private key server for decryption;
causing the private key server to decrypt more than one of the plurality of encrypted passwords with a private key component of more than one of the plurality of public/private encryption key pairs;
receiving at least one decrypted password from the private key server; and
accessing the electronic device according to one of a plurality of permission levels after transmitting the at least one decrypted password to the electronic device.

14. The method of claim 13, wherein said operation of accessing the electronic device comprises performing diagnostics on the electronic device.

15. The method of claim 13 wherein allowing the access by the client device comprises:
granting a first request when the received decrypted password matches a first password as the decrypted password;
granting a second request when the received decrypted password matches a second password; and
denying the second request when the received decrypted password matches the first password.

16. The system of claim 15, wherein the processing unit is further configured to
grant the second request when the received decrypted password matches the second password, and
deny the second request when the received decrypted password matches the first password.

17. A method comprising:
generating a plurality of passwords including a first password and a second password;
encrypting each of the plurality of passwords with a public key component of one of a plurality of public/private encryption key pairs;
storing the plurality of encrypted passwords in a storage medium;
receiving a request from a client device to access an electronic device;
in response to the request, transmitting the plurality of encrypted passwords to the client device;
causing the client device to submit more than one of the plurality of encrypted passwords to a private key server for decryption, the private key server configured to decrypt each of the encrypted passwords using a private key encryption component of one of the public/private encryption key pairs;
receiving from the client device a decrypted password that is one of the plurality of passwords; and
upon receiving the decrypted password, granting the client device an access to the electronic device, the access being an access of one of a plurality of permission levels.

18. The method in claim 17 further wherein receiving the decrypted password comprises:

receiving at least one of a decrypted first password and a decrypted second password, and wherein granting the client device the access comprises granting the client device the access of a first permission level upon receiving the decrypted first password; and granting the client device the access of a second permission level upon receiving the decrypted second password.

\* \* \* \* \*